Patented Feb. 28, 1933

1,899,053

UNITED STATES PATENT OFFICE

ARTHUR E. PETERSEN, OF WESTFIELD, NEW JERSEY, ASSIGNOR TO CELLULOID CORPORATION, A CORPORATION OF NEW JERSEY

IMITATION PEARL

No Drawing.   Application filed April 4, 1931. Serial No. 527,852.

This invention relates to the preparation of articles made of thermoplastic compositions which present nacreous or pearl-like effects.

An object of my invention is to prepare articles of thermoplastic compositions having a pearl-like appearance in a more expeditious and economical manner than has been heretofore possible. A further object of my invention is to prepare articles having a nacreous appearance over the entire surface thereof. Other objects of my invention will appear from the following detailed description.

The method heretofore employed for making articles of plastic compositions in imitation of mother-of-pearl is long, cumbersome and expensive. Briefly the essential features of the old process are the incorporation of the pearl essence throughout the mass of the plastic material, the formation of thin slabs therefrom, the cutting up of the slabs into irregular pieces and stacking them according to the figure desired, and finally pressing the pieces into a solid block and cutting sheets of any suitable thickness therefrom, which sheets have the desired pearl effect. It is then necessary to season these sheets for various lengths of time depending upon the thickness of the sheets, before the same may be shaped or fabricated into the desired articles.

Not only is this former method expensive, but the effects produced thereby are not uniform, since the pearl appearance is not over the entire surface, there being areas thereon which do not have nacreous effects.

I have found that articles having the wavy pearl or lustrous effects can be made by molding thermoplastic compositions containing the pearl essence in such a manner as to make many of the above described steps unnecessary, so that attractive articles can be made quite cheaply. Moreover by this method, articles can be made which have a nacreous appearance over substantially the entire surface without the presence of areas that have no pearl-like effect.

In accordance with my invention, I prepare articles having the appearance of mother-of-pearl from thermoplastic compositions by incorporating pearl essence therein, heating pieces or particles thereof until they become plastic or molten and forcing the mass through nozzles into molds or dies of the desired shape.

The thermoplastic composition to be molded contains organic derivatives of cellulose such as organic esters of cellulose and cellulose ethers. Examples of such organic esters of cellulose are cellulose acetate, cellulose formate, cellulose propionate and cellulose butyrate while examples of cellulose ethers are ethyl cellulose, methyl cellulose and benzyl cellulose. The composition may also contain suitable plasticizers such as camphor, dibutyl tartrate, dimethyl phthalate, diethyl phthalate, para ethyl toluene sulfonamid, triphenyl phosphate, triacetin, etc. as is well understood in the art. If desired pigments and/or dyes to impart the desired color and filling materials may be incorporated also.

The composition also contains pearl essence which may be fish scale essence, or imitation pearl essence such as silky mercurous chloride, silky lead iodide or any other known or suitable nacreous material, all of which are referred to in the claims as "pearl essence".

The derivative of cellulose, the plasticizer, the pearl essence and any other desired ingredients are worked up with a volatile solvent to form dopes or plastic masses which may be cast on the surfaces of film wheels, bands and the like to form sheets or which may be extruded through slits or slabs to form ribbons or thin slabs of a thickness of 0.070" to 0.10".

The sheets or slabs so formed are then subdivided into irregular pieces of suitable size having dimensions of say from ⅛ to ½". It is to be noted that these sheets and slabs have the appearance of solid color with the flat metallic lustre, there being no semblance of any wavy, pearly effect at this stage. These pieces are then placed at random in a pressure cylinder and heated to a suitable temperature, say 250 to 350° F., and then forced through a small nozzle into a die or mold. For this operation, apparatus similar in principle to that employed for the die-casting of metals may be used. If desired the sheets or slabs may be disintegrated to smaller particles or even in powder form, which may be heated and extruded into the die or mold.

In another form of this invention powdered plastic composition containing the derivative of cellulose and any other desired ingredients such as plasticizers, pigments, etc., but no pearl essence and made in any suitable manner may be intimately mixed with a suspension of pearl essence, such as fish scale essence, in an organic liquid that is not a solvent for the derivative of cellulose (examples of such liquids in the case of cellulose acetate are ethyl alcohol or butyl acetate). The organic liquid is then evaporated off and the resultant powder may be used for molding by the above described method.

If desired, the pieces, particles or powder of plastic material containing the pearl essence may be mixed with pieces of thermoplastic material of solid or contrasting colors to produce mottled effects.

Articles of any desired size or shape may be made in accordance with this invention, such as pencil and fountain pen barrels and caps, tooth brush and shaving brush holders, toilet articles of various kinds, etc.

It will be seen that by this invention molded pieces having beautiful wavy, irridescent, pearly effects may be produced very cheaply. Moreover there may be produced by this invention articles whose entire surface presents a nacreous effect without any blank areas, a result not attainable by any prior process.

One mode of procedure is as follows. The pearl essence is incorporated in a plastic mass made up of cellulose acetate and a plasticizer in the usual way by means of volatile solvents in amounts as high as 60% or more of the plastic mass. This mass is then forced through slits to form ribbons or thin slabs about 0.070″ in thickness. The slabs or ribbons are then placed in seasoning rooms until the residual solvent content is reduced to about 2%. The slabs are then cut into irregular pieces about ¼″ by ⅜″. The small irregular pieces are placed in a hopper from which they are fed to a cylinder, without regard to order, and heated to about 300° F. Pressure is then applied to the material which in the plastic or molten state, is forced through a small nozzle into the die or mold of the article to be made.

It is to be understood that the foregoing detailed description is given merely by way of illustration and that many variations may be made therein without departing from the spirit of my invention.

Having described my invention, what I desire to secure by Letters Patent is:

1. Method of forming articles having a pearl-like appearance comprising at least softening pieces or particles of thermoplastic composition containing pearl essence and forcing the same under suitable pressure into a mold.

2. Method of forming articles having a pearl-like appearance comprising at least softening pieces or particles of thermoplastic composition containing an organic derivative of cellulose and pearl essence, and forcing the same under suitable pressure into a mold.

3. Method of forming articles having a pearl-like appearance comprising at least softening pieces or particles of thermoplastic composition containing cellulose acetate and pearl essence, and forcing the same under suitable pressure into a mold.

4. Method of forming articles having a pearl-like appearance comprising forming sheet-like material of a thermoplastic composition containing an organic derivative of cellulose and pearl essence, breaking the same into pieces, heating said pieces while in random order, and forcing the same into a mold.

5. Method of forming articles having a pearl-like appearance comprising forming sheet-like material of a thermoplastic composition containing cellulose acetate and pearl essence, breaking the same into pieces, heating said pieces while in random order, and forcing the same into a mold.

6. Method of forming articles having a pearl-like appearance comprising forming a plastic mass containing an organic derivative of cellulose, a plasticizer and pearl essence, forming a sheet, film, or slab therefrom, dividing the same into pieces, placing the pieces in random position, heating the same and forcing the mass into a mold.

7. Method of forming articles having a pearl-like appearance comprising forming a plastic mass containing cellulose acetate, a plasticizer and pearl essence, forming a sheet, film or slab therefrom, dividing the same into pieces, placing the pieces in random position, heating the same and forcing the mass into a mold.

In testimony whereof, I have hereunto subscribed my name.

ARTHUR E. PETERSEN.

CERTIFICATE OF CORRECTION.

Patent No. 1,899,053.                                February 28, 1933.

ARTHUR E. PETERSEN.

It is hereby certified that the Certificate of Correction in the above numbered patent issued May 9, 1933, was erroneously drawn and should have read as follows: Page 1, line 87, for 0.10" read 0.010"; and that the said Letters with this correction therein that the same may conform to the record of the Patent should be read case in the Patent Office.

Signed and sealed this 15th day of August, A. D. 1933.

M. J. Moore.

(Seal)                                Acting Commissioner of Patents.